Figure 1:
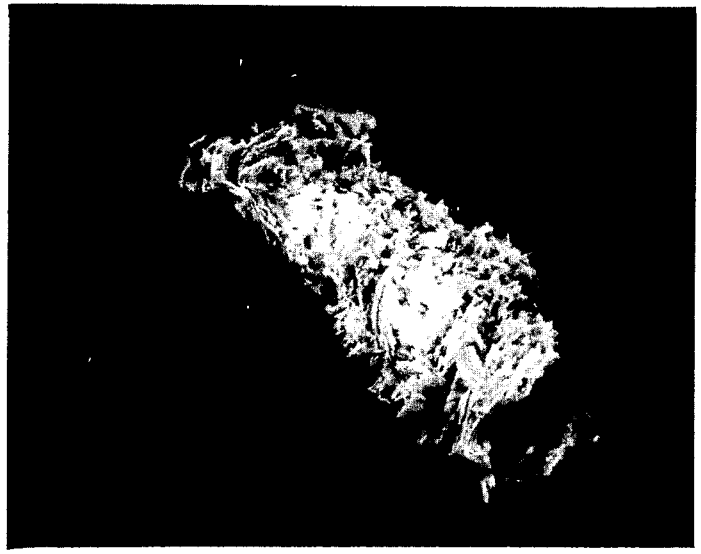

United States Patent [19]

Wu et al.

[11] 4,435,596

[45] Mar. 6, 1984

[54] PROCESS OF PRODUCING TEREPHTHALIC ACID

[75] Inventors: Yulin Wu; Ernest A. Zuech, both of Bartlesville, Okla.

[73] Assignee: Phillips Petroleum Company, Bartlesville, Okla.

[21] Appl. No.: 410,766

[22] Filed: Aug. 23, 1982

Related U.S. Application Data

[62] Division of Ser. No. 894,069, Apr. 6, 1978, Pat. No. 4,357,257.

[51] Int. Cl.$^3$ .......................................... C07C 51/347
[52] U.S. Cl. .................................... 562/481; 252/308; 252/314
[58] Field of Search .................. 562/481; 252/308, 314

[56] References Cited

U.S. PATENT DOCUMENTS

| | | | |
|---|---|---|---|
| 2,368,560 | 1/1945 | Minisch | 252/308 |
| 2,610,900 | 9/1952 | Cross | 302/66 |
| 3,746,752 | 7/1973 | Kuper | 562/481 |
| 3,751,457 | 8/1973 | Marwil | 562/481 |
| 3,781,341 | 12/1973 | Wu et al. | 562/481 |
| 3,787,487 | 1/1974 | Sherk | 562/481 |
| 3,873,609 | 3/1975 | Wu et al. | 562/481 |

OTHER PUBLICATIONS

Dalla Valle; Micromeritics, Pitman Publishing Corp., New York, (1943), p. 286.

Kirk–Othmer: Encyclopedia of Chemical Technology, (1963), 2nd Ed., vol. 7, pp. 372–373, John Wiley & Son, N.Y.

*Primary Examiner*—Natalie Trousof
*Assistant Examiner*—Vera C. Clarke

[57] ABSTRACT

A method for producing terephthalic acid from potassium benzoate in which the potassium benzoate is charged to the reactor in powdered form as a low viscosity slurry of potassium benzoate in terphenyl.

3 Claims, 1 Drawing Figure

PROCESS OF PRODUCING TEREPHTHALIC ACID

This is a division of application Ser. No. 894,069, filed Apr. 6, 1978, now U.S. Pat. No. 4,357,257.

FIELD OF THE INVENTION

Transporting crystals in the form of slurries is often a convenient method of transporting various materials to places where they are needed in various commercial operations. One example is the transportation of reactants such as potassium benzoate (KBz) used in the preparation of terephthalic acid (TPA). TPA is important in the production of polyester fibers.

For such transporting, it is important that the slurries have low viscosities. Low viscosity slurries, in general, (as compared with high viscosity slurries) are more easily pumped through transfer tubes, exhibit less deposition of crystals and decomposed material on the walls of the transfer tubes, and do not require such high transfer tube temperatures. Therefore, for these reasons, low viscosity slurries are preferable.

The prior art has taught that average particle size and particle shape are factors which affect viscosity. It is also known that for a given material having a given particle shape, as the size of the average particle decreases, the viscosity of the slurry produced therefrom increases.

However, the prior art has not determined the combined effect of particle size and particle shape on slurry viscosity. Furthermore, the problem of lowering viscosity in a particular slurry has not been solved for all materials.

Certain materials in the form of plate-shaped individual crystals have been found to form high viscosity slurries. For example, when an aqueous potassium benzoate solution is mixed with hot terephenyl (and water has evaporated therefrom), a high viscosity slurry is formed which contains thin plate-shaped individual crystals which range in size from about 10 to about 2000 µm in diameter, the majority lying within the range from about 200 to about 1100 µm.

It is an object of this invention to make a low viscosity slurry of crystals in a suitable dispersant.

It is also an object of this invention to transport potassium benzoate crystals which are used in a step in the production of valuable terephthalic acid.

STATEMENT OF THE INVENTION

According to the invention, a slurry is prepared by mixing a powder of granular shaped aggregates of crystals with a dispersant, the material used to prepare the powder being such that it forms thin, plate-shaped individual (i.e., not substantially aggregated) crystals when a dilute aqueous solution thereof is mixed with a dispersant in which said material is insoluble and to which said material is inert, and water is evaporated therefrom. The invention is applicable, for example, to the preparation of slurries of a powder of an alkali or alkaline earth metal salt of an aromatic mono- or polycarboxylic acid in dispersants which are polyaromatic compounds. In one embodiment, a low viscosity slurry of potassium benzoate powder (in the range of about 50 mesh to about 140 mesh U.S. standard sieve size, i.e., about 100 to about 300 µm) in terphenyl is prepared and then used in the preparation of terephthalic acid. Further, according to the invention, the powder is prepared on a drum dryer.

When compared with a slurry of individual crystals prepared by mixing an aqueous potassium benzoate solution with hot terphenyl, a slurry prepared by producing a powder of potassium benzoate on a drum dryer followed by mixing with hot terphenyl has a much lower viscosity. The difference is believed to be due primarily both to the differences in particle shape and average particle size, the particles produced by the drum dryer having a smaller average size and being more granular, as opposed to plate-like.

The particles which are compared in this invention are the particles as they are found in their respective slurries. The particles prepared by the method of mixing an aqueous potassium benzoate solution with hot terphenyl are observed in the terphenyl to be very thin and quite flexible plate-like individual crystals (plate-like crystals being smooth, flat, and with substantially uniform thickness). It is believed that the plate-like individual crystals formed in the comparative examples, described below, by adding potassium benzoate and water to terphenyl and (with stirring) evaporating the water are substantially identical to those prepared in the prior art method by adding an aqueous potassium benzoate solution to hot terphenyl and evaporating the water. On the other hand, the particles of powder prepared according to the invention have a shape which is granular, as opposed to plate-like. When the granular shaped crystal aggregates which form potassium benzoate powder have sizes within the range from about 50 mesh to about 140 mesh (i.e., about 100 to about 300 µm), a slurry prepared from such aggregates of crystals in terphenyl has a much lower viscosity than a slurry of plate-shaped individual potassium benzoate crystals having sizes within the range from about 10 µm to about 2000 µm in terphenyl. In this application, the size of an individual plate-shaped crystal or of a crystal aggregate is the measure of the largest linear dimension thereof in any one direction. Also, in this application, the term "powder" means the fine granular particles to which a relatively dry substance is reduced, for example, by pounding, grinding, cutting, or chopping; the term "granular particles" means individual granular crystals or granular aggregates of crystals; and the term "individual crystals" means that substantially no aggregation of crystals has occurred.

Referring to the drawing, a photograph of particles of powder of potassium benzoate prepared by use of a drum dryer is included herein. FIG. 1 (at a magnification of 200X) shows an aggregate (from run 5, described below) composed of individual, very tiny, and very irregular crystals. Because the crystal aggregates prepared by use of a dryer do not separate appreciably upon being placed into the dispersant, the size and shape of these aggregates are important factors in the determination of the viscosity of the resultant slurry.

An unexpected result which could not have been predicted on the basis of the prior art was found in the present invention. The largest dimension of the potassium benzoate powder prepared by use of the drum dryer is *smaller* than the largest dimension of most of the plate-shaped individual crystals in the prior art slurry, yet the viscosity is *lower*. On the basis of the prior art, this result could not have been expected.

PREFERRED EMBODIMENTS OF THE INVENTION

We have found that both crystal aggregate size and crystal aggregate shape are important factors in the viscosity of slurries prepared from powders of those crystals. Although the following description of the invention is written particularly in terms of potassium benzoate (which in some cases forms plate-shaped individual crystals) for which unexpected results have been found when the powder is prepared according to this invention, the invention is not to be construed as so limited. Rather, it is expected that whenever the material to be dispersed in a slurry is such that it sometimes forms individual plate-shaped crystals which are very thin, the viscosity of the slurry prepared from that material in the chosen dispersant can be lowered by first preparing a powder of the material and then mixing that powder with the dispersant.

Materials which are known to form plate-shaped individual crystals upon mixing a solution of the material with a dispersant, but which forms granular aggregates of crystals when a suitable solution is processed on a drum dryer, include the salts of certain aromatic mono- or polycarboxylic acids. Such salts are those having the formula

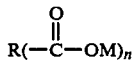

wherein R is an aromatic or alkyl aromatic group having 6 to about 35 carbon atoms, M is an alkali or alkaline earth metal nad n is the integer 1,2,3, or 4. These salts are readily prepared from the corresponding acids. Such acids include, for example, benzoic acid, 2-naphthalene carboxylic acid, 4-biphenylcarboxylic acid, 2,6-naphthalenedicarboxylic acid, phthalic acid, isophthalic acid, terephthalic acid, 2-anthracenecarboxylic acid, 1,5-anthracenedicarboxylic acid, 1,5,9-anthracenetricarboxylic acid, 3-phenanthrenecarboxylic acid, 2,3,4-trimethylbenzenecarboxylic acid, 2,4,6-trimethylbenzene-1,3-dicarboxylic acid, 2-ethyl-4-hexyl-6-methylbenzene-1,3-dicarboxylic acid, and 2,4-dibutylbenzene-1,3,5-tricarboxylic acid.

Excellent results have been obtained with potassium benzoate. It is expected that similar good results will be obtained with the other alkali metal salts as well as the alkaline earth metal salts of the above-listed acids.

In all the above-mentioned carboxylic acid salts the aromatic ring may carry alkyl radicals, in addition to the carboxylate groups, provided that these alkyl radical substituents do not bring about a decomposition of the molecule at temperatures equal to or lower than the reaction temperature.

When the aromatic monocarboxylic acid salts are used as starting materials for the process according to this invention, the low viscosity slurry so produced can, for example, be sent to a disproportionation reactor; and the products from the disproportionation reaction are industrially valuable alkali metal salts of dicarboxylic acids which can be readily converted to the corresponding dicarboxylic acids, i.e., for example, potassium benzoate can be disproportionated to form dipotassium terephthalate, which is readily converted to terephthalic acid. The disproportionation of an alkali metal carboxylate in an organic dispersant to an aromatic polycarboxylate is accomplished by any suitable method. For example, the method described in Wu et al, U.S. Pat. No. 3,873,609 using a disproportionation catalyst, such as zinc benzoate, can be utilized.

Any suitable method of forming a powder which forms a low viscosity slurry can be used in the practice of the invention. Using a drum dryer (which apparatus is described in Kirk-Othmer Encyclopedia of Chemical Technology, 2nd. Edition, Vol. 7, pp. 372–373 (1965), John Wiley & Son, Inc., N.Y.) is the preferred method, but other means are also within the scope of this invention. For example, spray drying-techniques may, under certain circumstances, yield powders that will give a low viscosity slurry. After a sheet of crystals has been formed on a dryer, one can use any powder-forming apparatus which forms a powder that yields a low viscosity slurry. When a drum dryer is used, any single or double drum dryer that yields a powder that forms a low viscosity slurry can be used.

The concentrations of aqueous solutions of potassium benzoate to be processed to form powder can range broadly from about 1 to about 90 and preferably from about 20 to about 60 g. of potassium benzoate per 100 g. of water. The temperature of the potassium benzoate solution being charged to the drum dryer should preferably be within the range from about 10° to 110° C., and more preferably from about 20° to about 100° C.

The drum dryer settings depend on the particular dryer used and on the concentration of the solution being charged to the dryer. For example, for a 6-inch double drum dryer and a solution containing 50 g. of potassium benzoate in 100 g. of water, formation of the desired powder is favored by the use of small drum gaps (0.004" or less), relatively slow drum speeds, and relatively low drum temperatures. The drum temperature is preferably within the range from about 90° to less than about 120° C. and more preferably within the range from about 100° to about 115° C. The optimum drum dryer settings for the preparation of potassium benzoate powders suitable for the preparation of low viscosity slurries can be readily determined for a particular drum dryer and potassium benzoate solution concentration by examining the terphenyl slurry viscosities of powders produced at various settings.

The powder produced by the drum dryer is preferably dried to remove excess moisture. For example, the moisture content of the powder to be utilized for the preparation of low viscosity slurries of potassium benzoate in terphenyl should be below about 0.3, and preferably below about 0.01 g of water per 1 g of potassium benzoate.

The particles of powder prepared in the practice of this invention can be any size that yields a low viscosity slurry in a dispersant. When using a 6-inch double drum dryer and potassium benzoate, the particles are generally in the range from about 50 mesh to about 140 mesh, U.S. Standard Sieves, (i.e., about 300 to about 100 μm) and appear to have a granular shape (i.e., having three substantial dimensions, unlike thin plate-shaped or needle-shaped crystals). Small quantities (for example, below about 10 weight percent) of smaller sized powders can be present and not significantly affect viscosity. Furthermore, small quantities (for example, about 10 weight percent) of individual crystals having plate shapes may be present and not significantly affect viscosity. While drum dryers larger or smaller than 6-inches may produce powders having somewhat different particle sizes, the powders so produced are expected to be useful in preparing low viscosity slurries.

The dispersant useful for the preparation of the slurry is one which does not decompose under the conditions of the process, which does not dissolve the powder, which is inert to the reactants, and which is relatively high-boiling. Suitable dispersants for the alkali metal salts of aromatic carboxylic acids include aromatic hydrocarbons selected from the group comprising aromatic compounds having three or more aromatic rings, polynuclear aromatics and mixtures thereof. Examples of such organic dispersants include terphenyls, quaterphenyls, pentaphenyls and heavier polyphenyls, binaphthyls, naphthalene, anthracene, phenanthrene, pyrene, triphenylene, chrysene, perylene, pentacene and mixtures thereof.

It is desirable that the dispersant remain in the liquid state throughout the process; thus, it should have a melting point below the lowest temperature employed in the process and a boiling point above the highest temperature employed in the process. For potassium benzoate, the dispersant should have a melting point below about 150° C.; and terphenyl is a suitable dispersant for potassium benzoate.

Mixtures of two or more suitable dispersant compounds can be utilized to reduce the melting point of the dispersant. It is also desirable that the dispersant have a relatively high boiling point in order to aid in maintaining the reaction pressure at a low level. For alkali metal carboxylate materials, the boiling point of the dispersant should be above about 200° C.

When alkali metal carboxylate materials are used in the invention, the organic dispersant is present in the slurry in an amount in the range from about 25 to about 80 percent by weight of the total weight of the slurry and preferably in an amount in the range from about 60 to about 75 percent by weight of the total weight of the slurry. It is to be understood that when the viscosities of two slurries are compared herein, the slurries being compared have the same percent by weight of dispersant to total slurry weight.

The slurry is formed by mixing a suitable dispersant with the prepared powder. Any suitable method of mixing a solid with a liquid can be used to form the slurry so long as the particles of powder do not dissociate to any substantial extent. For example, if a batch reactor is employed, the dispersant, in liquid form, is added to the reactor; then the solid powder, such as potassium benzoate, is added to the reactor while the liquid is being stirred. If a continuous reactor is employed, the solid is metered into a separate stirred mix tank which contains the liquid dispersant and the produced slurry is then introduced into the reactor.

EXAMPLES

The potassium hydroxide and benzoic acid used in the following examples were commercially available materials and were used without further purification. Potassium benzoate (KBz) was prepared by mixing equimolar amounts of benzoic acid and potassium hydroxide in water and by then evaporating the water. The terphenyl used was a mixture of isomers and contained 75.3 weight percent m-terphenyl, 19.9 weight percent o-terphenyl, and 4.4 weight percent p-terphenyl.

A drum dryer was used to prepare sheets of crystals which were then powdered by the knife edge of the dryer. The drum gap distance was one factor which was varied in the examples, as was drum temperature, drum speed, concentration of potassium benzoate solution charged to the drum dryer, and the overall method of slurry preparation.

The drum dryer used in the examples was a 6-inch diameter atmospheric double drum dryer (Buflovak Laboratory, Blaw-Knox Company Model ALC-4). Slurries were prepared from hot terphenyl (at the temperature indicated in each specific example) and potassium benzoate in a 2:1 weight ratio; and viscosities were determined with a Synchro-Lectric viscometer, Model, LV-1, with spindle #1. The slurries were placed in a vessel which was held in a constant temperature bath and were stirred until just before the viscosity determination. The temperature in the bath is given below in each example. The time of stirring was the same (to within a few minutes) for all of the examples, and any effects on slurry viscosity due to variations in the time of stirring are believed to be minimal.

EXAMPLE I

Four runs were conducted in which a solution containing 50 g. potassium benzoate per 100 g. water was fed at about 25° C. to the drum dryer which had a drum speed of 3.1 rpm. Powder was prepared at a variety of drum gaps and drum temperatures, and it was dried at 175° C. for 1 hour. The powder particles formed were granular-shaped. Slurries of the powders in terphenyl (heated to 150° C.) were prepared. Slurry viscosities results and dryer conditions are shown in Table I.

TABLE I

| Run No. | Drum Dryer Conditions | | Slurry Viscosity,[a] Centipoise |
|---|---|---|---|
| | Drum Gap, Inches | Drum Dryer Temp., °C. | |
| 1 | 0.01 | 122 | 410 |
| 2 | 0.004 | 115 | 70 |
| 3 | 0.004 | 122 | 350 |
| 4 | 0.004 | 132 | >2400[b] |

[a]Determined at a slurry temperature of 200°C.
[b]Very viscous slurry.

The results of these runs show that by decreasing drum gaps (runs 1 and 3) and by decreasing drum dryer temperatures (runs 2, 3 and 4), powders can be produced that result in slurries with increasingly lower viscosities.

EXAMPLE II

Three more runs were conducted in a manner similar to the runs in Example I, except that the drum gap was decreased to less than 0.004 in. and the drum speed was decreased to 1 rpm. Although both drum gap and drum speed were here different than in Example I, we believe that the decrease in viscosity was more an effect of the smaller drum gap than of the reduced drum speed. The concentration of the aqueous potassium benzoate solution was the same as in Example I. The dryer temperatures and the results of viscosity measurements on slurries of the resulting powders in terphenyl are shown in Table II. Again the powder particles formed were granular-shaped.

TABLE II

| Run No. | Drum Dryer Temperature, °C. | Slurry Viscosity,[a] Centipoise |
|---|---|---|
| 5 | 110 | 47 |
| 6 | 115 | 57 |

TABLE II-continued

| Run No. | Drum Dryer Temperature, °C. | Slurry Viscosity,[a] Centipoise |
|---|---|---|
| 7 | 122 | 300 |

[a] Determined at a slurry temperature of 200° C. The slurries were prepared at 150° C.

The results of these runs show that for a constant speed and drum gap, lowering the drum dryer temperature at which crystals are formed lowers the viscosity of slurries prepared from powders of such crystals. These runs also show that for potassium benzoate, in particular, low viscosity slurries are formed from powders prepared from crystals which were formed at drum dryer temperatures of 115° C. or lower.

Invention runs 2, 5 and 6 from Examples I and II demonstrate operability of the instant invention for the preparation of low viscosity potassium benzoate/terphenyl slurries by the use of a drum dryer.

COMPARATIVE EXAMPLE A

Two runs were conducted using potassium benzoate solution concentrations outside the scope of this invention for powder preparation. These runs were conducted in a manner similar to the runs in Example I except that a solution containing 100 g. of KBz per 100 g. of water was heated to 100° C. and charged to the double drum dryer which was at 115° C. The dryer conditions and slurry viscosities of terphenyl slurries prepared from the resulting powders are shown in Table III.

TABLE III

| Run No. | Drum Speed, rpm | Drum Gap, Inches | Slurry Viscosity,[a] Centipoise |
|---|---|---|---|
| 8 | 1 | 0.004 | 2400 |
| 9 | 3.1 | 0.004 | 760 |

[a] Determined at a slurry temperature of 200° C. The slurries were prepared at 150° C.

The results of these runs show that KBz solution concentrations above the concentrations used in Examples I and II result in powders that produce higher slurry viscosities (compare runs 8 and 6 and runs 9 and 2).

COMPARATIVE EXAMPLE B

According to a prior art method of slurry preparation, a mixture of 50 g. terphenyl, 25 g. (156 mmole) KBz, and 12.5 g. water was charged to a 300 ml autoclave and heated to 216° C. with stirring. Water was removed through a valve at a rate of 4.9 ml/hr. After about 3 hours, the autoclave was opened and the KBz/terphenyl slurry was removed for viscosity movement. The slurry viscosity at 200° C. was 1533 centipoise. The crystals which resulted from this prior art method were observed in the terphenyl to be individual crystals and were plate-shaped.

The result of this run (as compared with invention runs 2, 5 and 6) shows that a high viscosity slurry is obtained by mixing a particular KBz solution and terphenyl and then evaporating the water. It is believed that this method of slurry preparation (which is also used in Comparative Example C) is substantially equivalent to the prior art method of mixing an aqueous KBz solution with hot terphenyl.

COMPARATIVE EXAMPLE C

Also according to a prior art method of slurry preparation, a mixture of 50 g. terphenyl, 25 g. (156 mmole) KBz, and 25 g. water was charged to a 300 ml autoclave and heated at 216° C. with stirring. Water was removed at a rate of 8.9 ml/hr. After about 3 hours the autoclave was opened and the KBz/terphenyl slurry was removed for viscosity measurement. The slurry viscosity at 200° C. was 106 centipoise. These crystals formed were individual and were plate-shaped in the slurry.

The result of this run (as compared with invention runs 2, 5 and 6) shows that a relatively high viscosity slurry is obtained by mixing a particular KBz solution and terphenyl and then evaporating the water.

Although this invention has been described in detail with various illustrations, it is not to be limited by those illustrations. Rather, the invention is intended to include modifications which would be apparent to one skilled in the art.

What is claimed is:

1. In a method of producing terephthalic acid wherein potassium benzoate is disproportionated to form dipotassium terphthalate which is converted to terephthalic acid, the improvement comprising:
   (a) charging an aqueous solution of potassium benzoate to a dryer so as to produce a sheet of crystals of said potassium benzoate;
   (b) subjecting said sheet of crystals to a powder-forming apparatus so as to form a powder of said crystals, the size of said powder being within the range from about 50 mesh to about 140 mesh and the shape of said powder being granular;
   (c) mixing said powder with terphenyl so as to form a low viscosity slurry; and then
   (d) transporting said low viscosity slurry to a disproportionation reactor.

2. A method according to claim 1 wherein said aqueous solution of potassium benzoate contains an amount of potassium benzoate within the range from about 20 to about 60 g per 100 g of water.

3. A method according to claim 1 wherein said dryer is a drum dryer.

* * * * *